United States Patent [19]
Shiels et al.

[11] Patent Number: 5,848,934
[45] Date of Patent: Dec. 15, 1998

[54] INTERACTIVE ENTERTAINMENT ATTRIBUTE SETTING

[75] Inventors: Martin A. Shiels, Brighton; Richard S. Cole, Redhill; Paul J. Rankin, Horley; Rosa Freitag, London, all of England

[73] Assignee: U.S. Philips Corporation, New York, N.Y.

[21] Appl. No.: 705,889

[22] Filed: Aug. 29, 1996

[30] Foreign Application Priority Data

Aug. 31, 1995 [GB] United Kingdom ............. 9517807

[51] Int. Cl.⁶ ............................................. A63F 9/22
[52] U.S. Cl. ................................................ 463/9; 463/31
[58] Field of Search ........................... 463/1, 9, 31, 36, 463/410; 395/700.05

[56] References Cited

U.S. PATENT DOCUMENTS

| | | | |
|---|---|---|---|
| 3,318,517 | 5/1967 | Wells | 235/52 |
| 4,305,131 | 12/1981 | Best | 364/521 |
| 4,333,152 | 6/1982 | Best | 364/521 |
| 4,445,187 | 4/1984 | Best | 364/521 |
| 4,569,026 | 2/1986 | Best | 364/521 |
| 4,846,693 | 7/1989 | Baer | 434/308 |
| 5,005,143 | 4/1991 | Altschuler et al. | 364/554 |
| 5,161,034 | 11/1992 | Klappert | 358/342 |
| 5,737,527 | 4/1998 | Shiels et al. | 395/200.09 |
| 5,751,953 | 5/1998 | Shiels et al. | 395/200.09 |
| 5,754,770 | 5/1998 | Shiels et al. | 395/200.09 |

FOREIGN PATENT DOCUMENTS

| | | |
|---|---|---|
| B7270987 | 1/1991 | Australia . |
| B3595889 | 8/1991 | Australia . |
| WO9208531 | 5/1992 | WIPO . |
| WO9413105 | 6/1994 | WIPO . |
| WO9427677 | 8/1994 | WIPO . |

*Primary Examiner*—Jessica J. Harrison
*Assistant Examiner*—James Schaaf
*Attorney, Agent, or Firm*—Edward W. Goodman

[57] ABSTRACT

A method of controlling, and apparatus for, an interactive entertainment system, in which user input influences the path taken through a narrative branch structure (90). Features of the narrative are assigned a respective attribute store containing an attribute value (80–83) and, for at least some paths of the narrative (XA,AB,AC,CD), one or more of the attribute values are altered. At least one branch point (E) of the narrative has conditional access (Y) and default paths (N) leading therefrom, with access being enabled or denied on the basis of one or more current attribute values.

4 Claims, 4 Drawing Sheets

INTERACTIVE ENTERTAINMENT ATTRIBUTE SETTING

BACKGROUND OF THE INVENTION

1. Field of the Invention

The present invention relates to interactive entertainment systems and, in particular, to such systems in which the user is able to control directly or indirectly, the path of a narrative or plot line.

2. Description of the Related Prior

An example of such a system is described in U.S. Pat. No. 4,305,131 to Robert M. Best, and comprises a motion picture system in which the viewer is treated as a character in the narrative. At branch points in the narrative, a character on screen will ask a question of the viewer: the viewer is provided with a hand held menu screen on which two or more command words appear, which words are among the limited vocabulary of a speech recognition unit of the system. The branch taken by the narrative will depend on how the viewer responds to the on-screen character's question, that is to say, which of the command words is spoken by the viewer. The multiple story lines are held on optical disc as independently addressable video frames, blocks of compressed audio and/or cartoon graphics.

A drawback with systems such as that of Best is that the user's enjoyment of the uncertainty as to what will happen next is diminished by the immediate 'reaction to interaction' as well as the blatant clues given by way of user cues: for example, the cue "do we fight or do we run" makes it fairly obvious to the user what he will see on selection of either branch.

SUMMARY OF THE INVENTION

It is, accordingly, an object of the present invention to provide an interactive entertainment system wherein the users interaction guides the path through a narrative, but that path selection is subject to modification by the system on the basis of narrative factors of which the user is not immediately aware.

In accordance with the present invention, there is provided an interactive entertainment apparatus operable to output sequences of image frames comprising a user-influenced path through a branch-structured narrative, the apparatus comprising: a source of image frame data for all branch structure paths of the narrative; branch storage means for storing data defining the narrative branch structure; user operable input means; branch selection means coupled to the branch storage means and operable to determine when the narrative reaches a branch point and to call one of two or more image frame sequences from the image frame source in dependence on the user input; and an output for the selected image frame sequences; characterized in that the apparatus includes one or more attribute stores, the or each attribute store holding an attribute value and being assigned to one or respective predetermined features of the narrative, wherein user-directed selection at least one branch point causes the branch selection means to modify the, or one of the, attributes values, and selection of at least one branch path at a further branch point is enabled or disabled with the branch selection means on the basis of the, or one of the, modified attribute values.

Thus, as the user moves through the narrative structure, he/she may accumulate a number of different attribute values which will affect later choices of branch paths. The user is unaware of the attribute values and, hence, cannot know what influence they might have on the narrative path. These later branch paths may be selected automatically (as opposed to just being locked or unlocked) with the branch selection means being arranged to select a branch path on the basis of one or more current attribute values. Such "automatic" branch points may suitably be identified to the apparatus in data from the branch storage means.

The or each of the attribute stores may further store a default attribute value, and the branch selection means may be operable to reset the or each attribute value to its respective default value. The branch selection means may be arranged to reset an attribute value to its respective default value if that attribute value has remained unaltered for a predetermined period of time.

Additionally, the branch selection means may be operable to modify one or more of the stored default attribute values, or the user may be enabled to do so, and the apparatus may further comprise image generating means coupled with the attribute store or stores and operable to generate a visual indicator of current attribute values.

Also in accordance with the present invention, there is provided a method for, controlling an interactive entertainment apparatus, wherein the apparatus presents to the user a branch-structured narrative, and user input determines which path is followed at at least one narrative branch point, characterized in that one or more features of the narrative have attribute stores assigned to them with the or each store holding an attribute value, wherein user-directed selection at at least one branch point causes the apparatus to modify the or one of the stored attribute values, and access to one or more paths of the narrative at a subsequent branch point is enabled or disabled on the basis of the or one of the modified attribute values.

BRIEF DESCRIPTION OF THE DRAWINGS

Further features and advantages of the present invention will become apparent from reading the following description of preferred embodiments of the present invention, given by way of example only, and with reference to the accompanying drawings, in which.

DETAILED DESCRIPTION OF THE PREFERRED EMBODIMENTS

In the following, we concentrate particularly on the case where the image frames accompanying the narrative are video frames, although, as will be recognized (and as will be described), the present invention is equally applicable to sequences of animated image frames, and compound frames formed, for example, of a "blue-screened" video image or sprite overlying an animated background.

Figure 1:
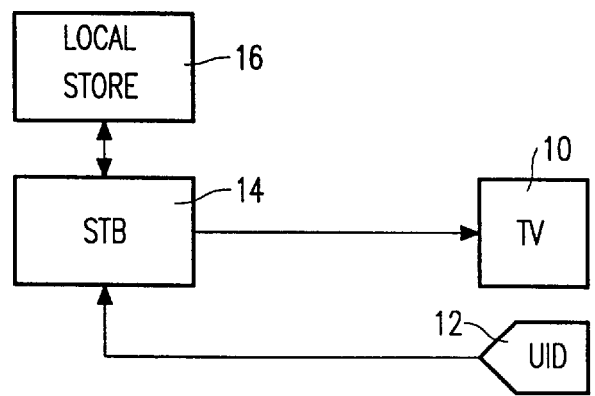
FIGS. 1 to 4 show differing combinations of material source supplying a user interface apparatus embodying the present invention.

FIGS. 1 to 4 represent a number of different ways by which an interactive narrative may be supplied to a user. In each case, the user views the received narrative on a monitor screen 10, suitably a television set, and is provided with an input device (UID) 12 for inputting commands, responses or other data as required by the particular application. In addition, the user is provided with an interface apparatus in the form of a set-top box (STB) 14 to which the narrative source or sources are coupled, to which the user commands are input, and from which the television receives the signal for display. The user input device 12 has a few simple controls as required by the application, for example, three select buttons and up/down/left/right shift controls or a joystick, and may be hard-wired to the STB as shown in FIG. 1, or connected by infra-red (IR) link in known manner as in FIG. 2.

Figure 2:
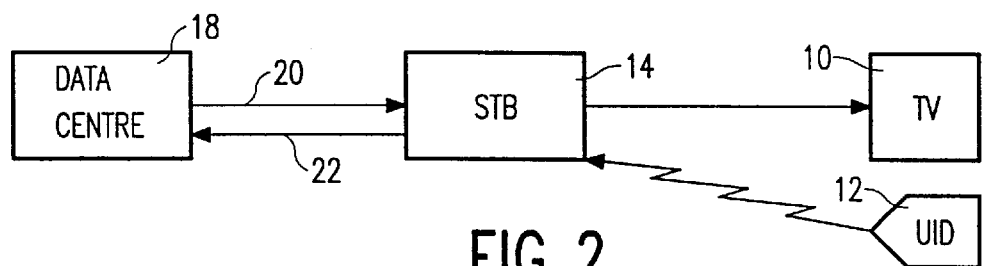
Figure 3:
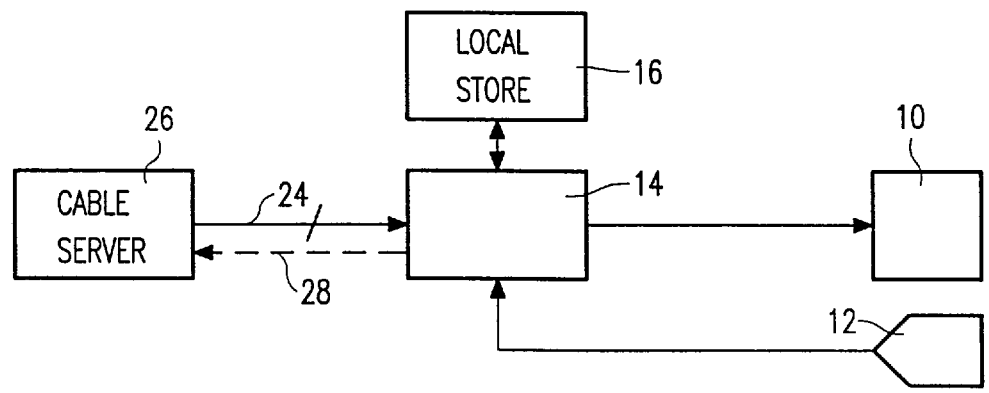
Figure 4:
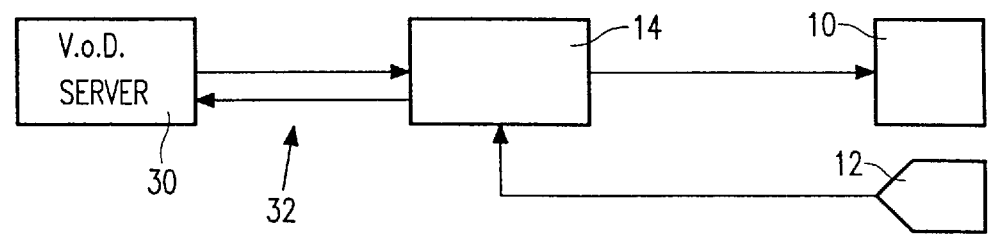

In the embodiment of FIG. 1, the narrative video and structure together with subsidiary information is supplied wholly from a local data source 16, such as a compact disc player or CD-ROM. In the embodiment of FIG. 2, the narrative video, structure and other information is supplied wholly from a remote source 18 via a data network 20, with user commands being sent to the remote source via a return path 22 of the network. In the embodiment of FIG. 3, the narrative video and other information is supplied as multiplexed channels on a single line 24 from a remote source 26, such as a cable television network server and is supplemented by information such as the structure from the local data source 16. In order to avoid the need for mass memory at the user site, a return line 28 may be provided to give the user site at least partial control over the information sent out from the remote store, for example, to enable recall of identified portions of video out of sequence. In the embodiment of FIG. 4, the narrative is supplied via a Video-on-Demand (VoD) system from a server 30 over a network 32, access to which may require the user to enter an identification code or insert a smart-card or similar into an appropriate card reader to enable decryption of encrypted signals. As will be described, rather than providing separate units for decryption and card reading, these functions may be provided within the STB.

Figure 5:
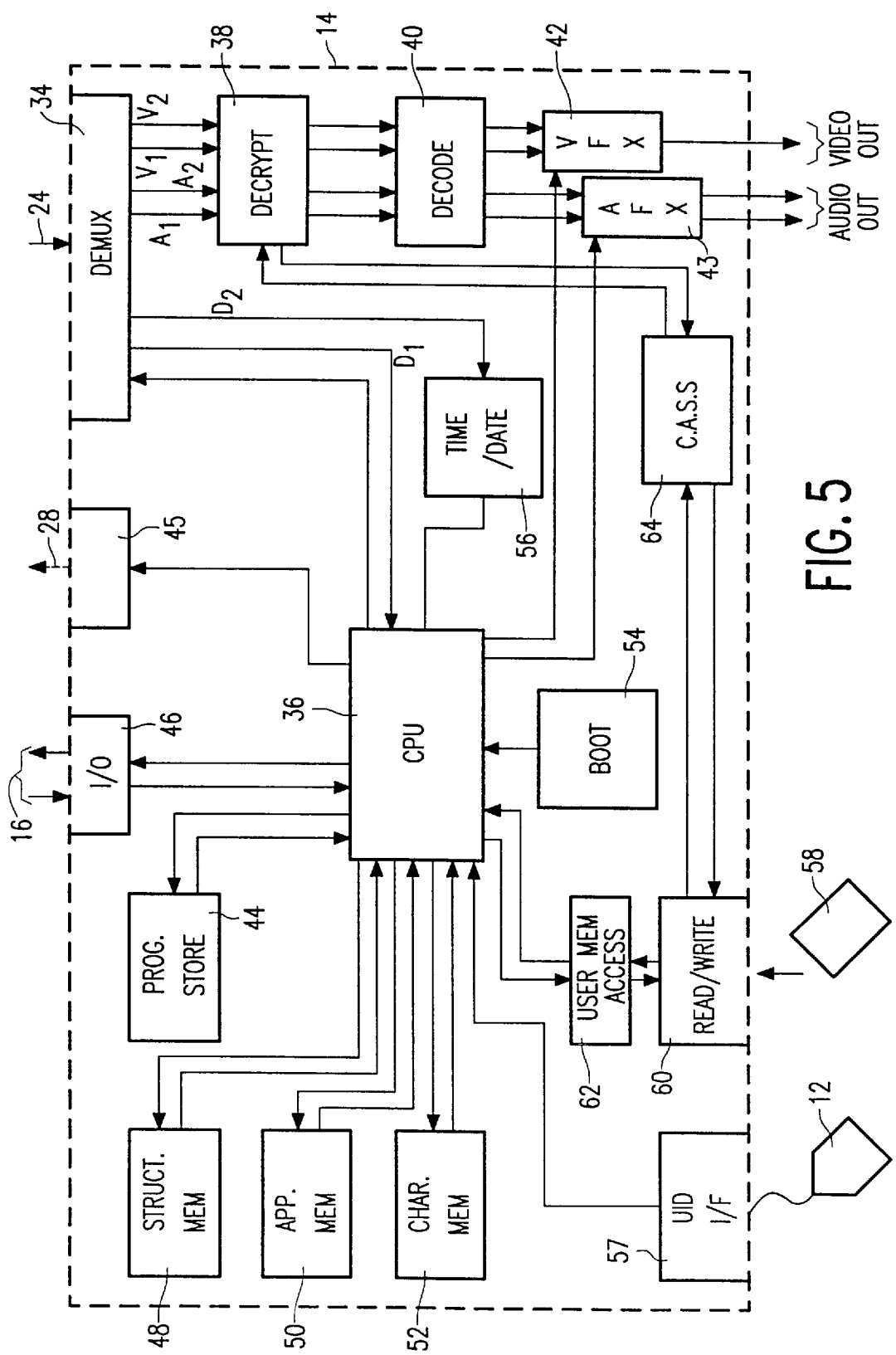
FIG. 5 is a schematic representation showing the user interface apparatus of FIG. 3 in greater detail.

FIG. 5 shows the internal structure of the STB 14 when set up for the configuration of FIG. 3, that is to say with input from both remote source 26 via network 24 and local source 16. The incoming signal from the network 24 contains a number of independent service components (audio, video and data streams) multiplexed together. In this example, the signal contains two data streams $D_1$ and $D_2$, the functions of which are explained below, together with two audio streams $A_1$ and $A_2$ (for example, left and right channels of a stereo audio signal) and two video frame streams $V_1$ and $V_2$. The multiplexed signal is received by a demultiplexer 34 which splits it into the separate components under control of a processor 36. Before being outputted from the STB, the audio and video may pass through decryption 38 and decoding 40 stages, the video signals may be processed 42 to provide video effects, such as picture-in-picture (PIP), and the audio may also be treated 43, as will each be described below.

The first of the data streams $D_1$ is inputted to the processor 36 and contains program information specifying how the processor is to handle the audio and video streams and other information specific to features of the particular interactive narrative. This program information is held by the processor in program store 44. A specification for the branch structure of the narrative may be downloaded via $D_1$ (in response to a processor call on the network return path 28, via interface 45) or it may be read from local storage 16 via interface 46, with the processor sending track addressing and play commands as required. The branch structure is stored in structure memory 48, with further memories being provided for application features 50, which may be specific features of a title, and for character attributes 52, the particular function of which will be described below. While shown in the Figure as separate stores, it will be readily appreciated that the program store 44 and the structure, application and character memories, 48, 50, 52 may be provided as respective areas of a single memory, provided that the more detailed addressing and associated access times for the larger memory do not unduly affect performance.

On powering up of the STB 14, a bootstrap loader 54 initialize the processor and instructs it to call for the branch structure and program information from the appropriate sources. Alternatively, and more simply, the bootstrap loader 54 may just initiate the calling up of the program information, with the first instruction of that program information being for the processor 36 to call up the branch structure and store it in program store 44.

Some narrative applications may require information as to the current date and/or time of day and, to avoid the need for the STB to maintain an accurate, non-volatile, clock source, a time/data store 56 is provided, with the timing information being updated at regular intervals from the remote source using data component stream $D_2$ as shown. For the FIG. 1 embodiment, where there is no remote source, the data/time information might be obtainable from the local source if that maintained its own clock.

Signals from the user input device (UID) 12 are received by the STB at UID interface 57 and, from there, passed to the processor 36. If, as in FIG. 2, the UID 12 is coupled to the STB via infra-red link, the interface 56 would include a suitable infra-red receiver.

Some forms of narrative entertainment may be sporadic or episodic with the equipment being switched off in between episodes. To avoid the user being forced to re-start from scratch each time the equipment is switched on, a non-volatile user memory is provided in which features, such as the user's current position within a narrative, user preferred system settings, character attributes, etc., are stored. The user memory may suitably be held on a removable storage device, such as a smart card 58, with the STB having a suitable card reader 60 with access to that area of the card storing the user memory being made via user access control 62: user memory access control 62 may, alternatively, be a purely software route executed within processor 36.

In some circumstances, the interactive entertainment may be provided by a remote server on a "pay-per-play" basis with the audio and video signals being transmitted in encrypted form and requiring particular key codes to enable them to be decrypted. In such a situation, the smart-card 58 providing the non-volatile user memory may have a further function as a part of the decryption system. In such a case, the smart-card 58 would carry a series of the codes, one or more of which would be required by decrypter 38 to decrypt the audio and video signals. Data stream $D_1$ would contain an identifier for one or more of the codes, which identifier would be passed to a conditional access sub-system (CASS) 64, which, in turn, would use the identifier to address the stored codes on the smart-card (via card reader 60) and, having obtained the necessary code or codes from the smart-card, the CASS 64 would forward the obtained codes to the decrypter 38.

Where the video and/or audio signals are transmitted in compressed form, for example, discrete cosine transform coded video according to MPEG standards, the decoder 40 may be provided. A switchable by-pass to the decoder (not shown) may be provided for the case where the display (television) is already equipped with, and set up for, decoding of the standard.

The video effects stage 42 is operated under control of the processor 36 to provide those features of the displayed image which are locally generated under the direction of the application program and/or user input, rather than being present in the video data supplied from the remote or local source. Such features may include menu bars, user movable cursors, system messages and so forth. As previously mentioned, one of the possible video effects is picture-in-picture (PIP) where the in-screen picture may be used to provide supplementary or future historical information about the narrative to the user. In one possible arrangement, video data streams $V_1$ and $V_2$ may synchronously show a particular scene of the narrative being played out, but with each being presented through the "eyes" of a different character within the scene.

Where the narrative is composed of animated (rather than video) images, the video effects stage 42 may handle the rendering of the images, with the remote source supplying the source and instruction data. While this would require a significant increase in processing power for the STB, the user interaction could then include modification of the images themselves in addition to directing narrative branch point selection.

The audio effects stage 43 may be used for processing the received audio signals $A_1, A_2$ in order to generate effects, such as echo, without requiring supply and/or storage of multiple versions of an audio segment. The stage may also be used for local generation of some sound effects, suitably those required as immediate response to a user input, with basic waveform data, call commands, and so forth, being downloaded to the application memory 50 at the start of a session or on initialization.

Figure 6:
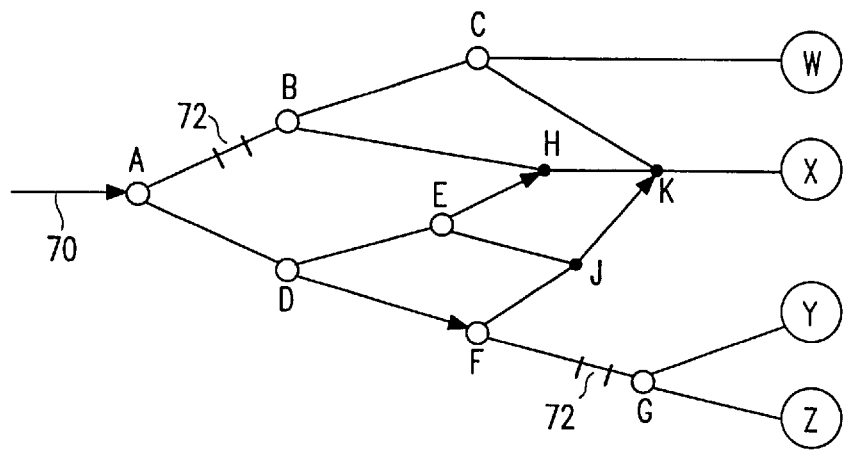
FIGS. 6 and 7 illustrate differing arrangements of interactive narrative structure.

Different forms of narrative structure may be supported by the STB of FIG. 5, using various of the facilities it provides, as required by the particular form of the narrative. FIG. 6 shows a branched narrative structure starting with a common introductory portion 70, which would serve to set the scene for the narrative, introduce the viewer to the characters, and so forth. At branch nodes A to G, a decision is required as to which path the narrative will take, with the user navigating through the network of possible story lines to reach one of the four possible endings W to Z. One or more of these nodes may be a conditional node (as will be described) at which the path selection is not wholly under user direction and, indeed, may be made by the system independently of the user. In order to avoid an "explosion" of possible endings, which would require a large amount of video data to be available for a relatively short narrative, some paths combine (at nodes H, J and K) such that some sections of the narrative (for example, H to K) may appear within the narrative regardless of which path is chosen, at node A, for example.

In order to maintain the user's "immersion" in the narrative story line, it is important that, at both branching and combining nodes there is no discernable break in the video stream. Detailed techniques for seamless joining of video sequences are described in, for example, our co-pending United Kingdom patent applications 9424429, 9424436 and 9424437, corresponding, respectively, to U.S. patent applications Ser. No. 08/563,471, filed Nov. 28, 1995, and Ser. Nos. 08/565,697 and 08/565,698, both filed Nov. 30, 1995 (our references: PHB 33952, PHB 33950 and PHB 33951). A principal requirement for seamless joining is that the system has sufficient time to call up the selected next video segment and synchronize its start to the end of the present sequence. To enable this, a finite period prior to the end of the present video sequence is provided, for example, as shown at 72 in FIG. 6, during which period the user may interact via UID 12 (FIG. 1). The location of the interaction periods 72 relative to the narrative is a feature of the structure, and is held in structure memory 48 of the STB (FIG. 5).

The existence of an interaction period may be indicated to the viewer in a number of different ways. For example, a menu of possible options may be displayed on the screen: this menu is preferably provided via the video effects unit 42 of the STB such that, as soon as the user has selected an item, the menu may be removed from the screen to minimize the intrusion. The positioning of the menu should be such as to avoid blocking the on-screen story and may be provided as, for example, a picture-in-picture or as a pull-up menu which the user can access during an interaction period. Audio cues may also, or alternately, be provided.

Each branch node of the narrative is preferably provided with a default setting such that, if there is no user input during the interaction period 72, then the narrative will continue along the default path without stalling for lack of instruction.

The audio accompaniment to the video sequences of FIG. 6 is not tied to the video itself but instead is called up as a feature of the narrative structure. This enables sections of the audio (such as dramatic or background music) to be re-used during the course of the narrative, for example, to provide an audio, rather than visual, cue to the user that interaction may take place or is required. As mentioned, some of the audio may also be locally generated.

Figure 7:
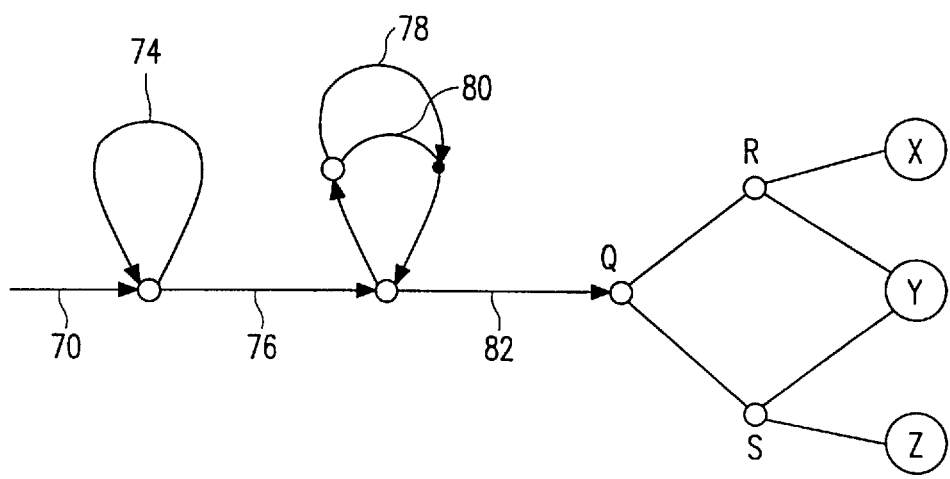

An alternative arrangement for the branch structure is shown in FIG. 7. As before, the narrative starts with a common introductory portion 70 leading to a first branch node L. Instead of a diverging branch output, branch node L provides access to a narrative loop 74 which returns to node L at its end, following which the narrative continues along path 76 to another branch node M. The narrative loop 74 may be used to enable the viewer to access background or subsidiary information to the narrative: the default setting for node L would be to continue with narrative section 76. At node M, a further narrative loop is provided having, within that loop, a further branch node N and recombining node P linked by two possible loop narrative paths 78 and 80. Multiple loop nestings, as well as loops within loops may be provided. As shown, the narrative loop structure may be combined with a diverging branch structure with diverging branch node Q following narrative section 82 and further branch nodes R and S leading to conclusion of the narrative at one of three possible endings X, Y or Z.

Figure 8:
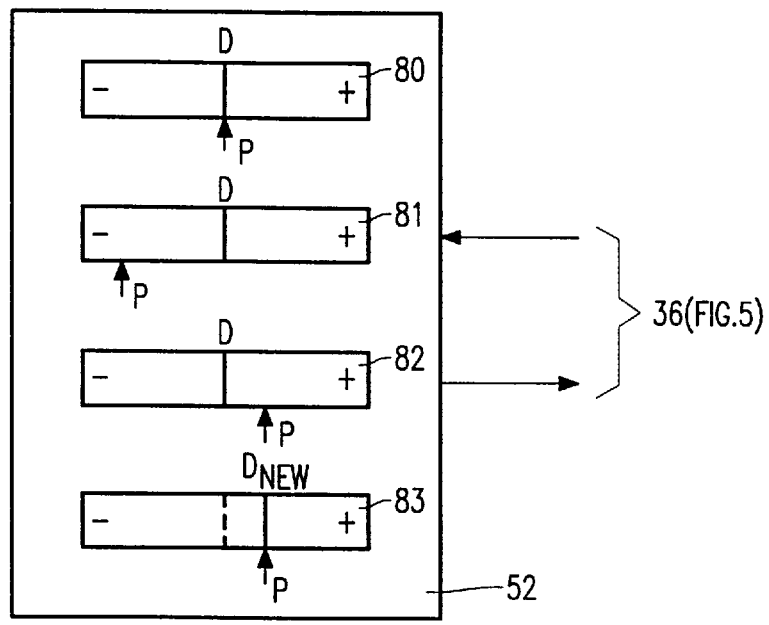
FIG. 8 schematically represents the operation of the character (attribute) memory of FIG. 5.

In order to avoid the requirement for user interaction prior to each and every branch point of the structure, path selection at some of the branch points is, instead, dependent on the previous paths taken by the user. FIG. 8 schematically represents how the character memory (52, FIG. 5) is arranged to provide the historical information. A number of sliding scales 80 to 83 are provided, each having a movable pointer to a current value P and a central default value D. On initialization of the system, each of these sliders is assigned to an attribute (a respective character or feature of the narrative), which attributes will have an effect on the selection at at least one branch point during the course of the narrative. From initial settings at the default value D, or some other user set value, the pointers for each character will be moved up or down the scale as interactions lead the user into paths where situations related to that character take place.

Figure 9:
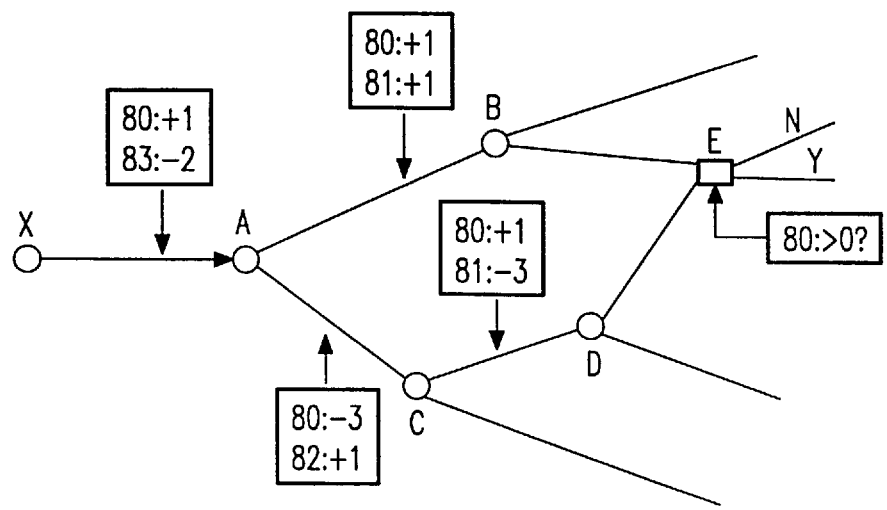
FIG. 9 represents a segment of a narrative structure including an attribute-conditional branch point.

FIG. 9 shows a segment of narrative structure for which some of the paths affect attribute value settings as shown: the numbers in the left-hand side of the boxes refer to the respective sliding scales 80–83 of FIG. 8. Branch node E is a conditional node linked to the attribute of scale 80, where the outgoing path depends on the attribute value at the time that that node is reached. In the example, starting from node X, and with an initial default value of 0, node E may be reached with a value of +2 or −1 for attribute 80. With an attribute value of +2, the node condition is satisfied and both paths (Y,N) from the node are available: with an attribute value of −1, the user is locked out of path Y. At the condition node, if only one path is unlocked to the user, that path may be automatically selected without the user being required to interact. If the node condition is satisfied, the user may automatically be sent along the non-default path or may be given the option through interaction to select the path.

In addition to the narrative sequences affecting character attribute values, the branch nodes themselves may have an effect on the stored attribute values, for example, incrementing, decrementing or resetting to the default values. Also, the default values themselves may be movable with, for example, consistent or extreme pointer positioning on one side of the default leading to gradual movement of the default towards that side.

From reading the present disclosure, other modifications and variations will be apparent to persons skilled in the art. Such modifications and variations may involve other features which are already known in the art and which may be used instead of or in addition to features already described herein. For example, some of those features described in relation to the STB (14, FIGS. 1 to 5) may, instead, be provided within a personal computer and others within a television or display unit. The reference to an apparatus in the following claims will be readily understood to cover all arrangements where the various recited features operate together in the manner described, regardless of whether those features are provided in a single unit or distributed among a number of interconnected units.

Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention. The applicants hereby give notice that new claims may be formulated to such features and/or combinations of such features during prosecution of the present application or of any further application derived therefrom.

What is claimed is:

1. Interactive entertainment apparatus operable to output sequences of image frames comprising a user-influenced path through a branch-structured narrative, the apparatus comprising:

a source of image frame data for all branch structure paths of the narrative;

branch storage means for storing data defining a narrative branch structure;

user operable input means;

branch selection means coupled to the branch storage means for determining when the narrative reaches a branch point and for calling one of two or more image frame sequences from the image frame source in dependence on the user input; and an output for the selected image frame sequences; characterized in that the apparatus further comprises one or more attribute stores, the or each attribute store storing an attribute value and a default attribute value, and being assigned to one or respective predetermined features of the narrative, wherein the branch selection means is operable to reset the or each attribute value in the or each attribute store to the respective default attribute value, and user-directed selection at at least one branch point causes the branch selection means to modify the, or one of the, attributes values, and selection of at least one branch path at a further branch point is enabled or disabled by the branch selection means on the basis of the, or one of the, modified attribute values, and wherein the branch selection means is further operable to modify one or more of the stored default attribute values.

2. Apparatus as claimed in claim 1, wherein the branch selection means is arranged to select a branch path on the basis of one or more current attribute values at a branch point identified by data from the branch storage means.

3. Apparatus as claimed in claim 1, wherein the branch selection means is arranged to reset an attribute value to its respective default attribute value if that attribute value has remained unaltered for a predetermined period.

4. Apparatus as claimed in claim 1, further comprising image generating means coupled with the attribute store or stores and operable to generate a visual indicator of current attribute values.

* * * * *